US012568014B2

(12) United States Patent
Dutia et al.

(10) Patent No.: US 12,568,014 B2
(45) Date of Patent: Mar. 3, 2026

(54) DISTRIBUTION OF INTENT BASED NETWORK CONFIGURATION OF NETWORK DEVICES INCLUDING MULTI-TENANT NETWORK DEVICES

(71) Applicant: Cisco Technology, Inc., San Jose, CA (US)

(72) Inventors: Bhairav Dutia, Santa Clara, CA (US); Manish Jiwansingh Mehra, Los Altos, CA (US); Upendar Surabhi, Fremont, CA (US); Sharmishtha Upadhyay, Fremont, CA (US); Sanjeev Pandurang Tondale, Fremont, CA (US); Yanbo Zhang, San Jose, CA (US); Yogesh Mittal, Sunnyvale, CA (US); Nithin Bangalore Raju, Saratoga, CA (US); Srilatha Tangirala, San Jose, CA (US); Balaji Sundararajan, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 383 days.

(21) Appl. No.: 18/122,931

(22) Filed: Mar. 17, 2023

(65) Prior Publication Data

US 2024/0073084 A1 Feb. 29, 2024

Related U.S. Application Data

(60) Provisional application No. 63/400,471, filed on Aug. 24, 2022.

(51) Int. Cl.
| | |
|---|---|
| *H04L 41/0681* | (2022.01) |
| *H04L 41/0686* | (2022.01) |
| *H04L 41/0894* | (2022.01) |

(52) U.S. Cl.
CPC ...... *H04L 41/0681* (2013.01); *H04L 41/0686* (2013.01); *H04L 41/0894* (2022.05)

(58) Field of Classification Search
None
See application file for complete search history.

(56) References Cited

U.S. PATENT DOCUMENTS

| | | | |
|---|---|---|---|
| 2016/0057052 A1* | 2/2016 | Zhang | H04L 41/0863 709/239 |
| 2016/0241436 A1 | 8/2016 | Fourie et al. | |

(Continued)

OTHER PUBLICATIONS

Han, Yoonseon, et al., "An Intent-based Network Virtualization Platform for SDN," 2016 IEEE, 10 pages.

*Primary Examiner* — Atta Khan
(74) *Attorney, Agent, or Firm* — Lee & Hayes, P.C.

(57) ABSTRACT

Techniques and architecture are described for a pull model for obtaining and implementing config changes on network devices are described herein. A user submits intent configuration to the network controller that needs to be delivered to several network sites. The network controller generates a config file. The network controller sends a pull notification message to all network devices that need to retrieve the config file. This pull notification message only contains a corresponding transaction ID for each network device and a location for the network device to use to pull the config file. The network devices may utilize a HTTP REST API exposed by the network controller to obtain the config file from the network controller. The network devices may utilize a REST API exposed by the network controller to reply with statuses of the configuration transaction. The techniques and architecture may be applied to multi-tenant network devices.

18 Claims, 5 Drawing Sheets

400 ⟶

RECEIVE, AT A NETWORK CONTROLLER FROM A USER, A NETWORK POLICY INTENT CONFIGURATION
402

SEND, BY THE NETWORK CONTROLLER TO THE NETWORK DEVICE, A NOTIFICATION MESSAGE, WHEREIN THE NOTIFICATION MESSAGE COMPRISES A TRANSACTION ID
404

BASED AT LEAST IN PART ON THE TRANSACTION ID, OBTAIN, BY THE NETWORK DEVICE AT THE NETWORK CONTROLLER, A CONFIGURATION FILE
406

RECEIVE, BY THE NETWORK CONTROLLER FROM THE NETWORK DEVICE, A FIRST STATUS MESSAGE INDICATING A STATUS OF APPLICATION, BY THE NETWORK DEVICE, OF THE CONFIGURATION FILE TO THE NETWORK DEVICE
408

(56)        References Cited

U.S. PATENT DOCUMENTS

| | | |
|---|---|---|
| 2016/0255051 A1 | 9/2016 | Williams et al. |
| 2017/0332438 A1* | 11/2017 | Olsson ................. H04W 28/12 |
| 2019/0372844 A1 | 12/2019 | Moats et al. |
| 2020/0195501 A1* | 6/2020 | Shenoy ............... H04L 41/0863 |
| 2021/0218642 A1 | 7/2021 | Pasupathy et al. |
| 2021/0367832 A1 | 11/2021 | Ramachandran et al. |

\* cited by examiner

200

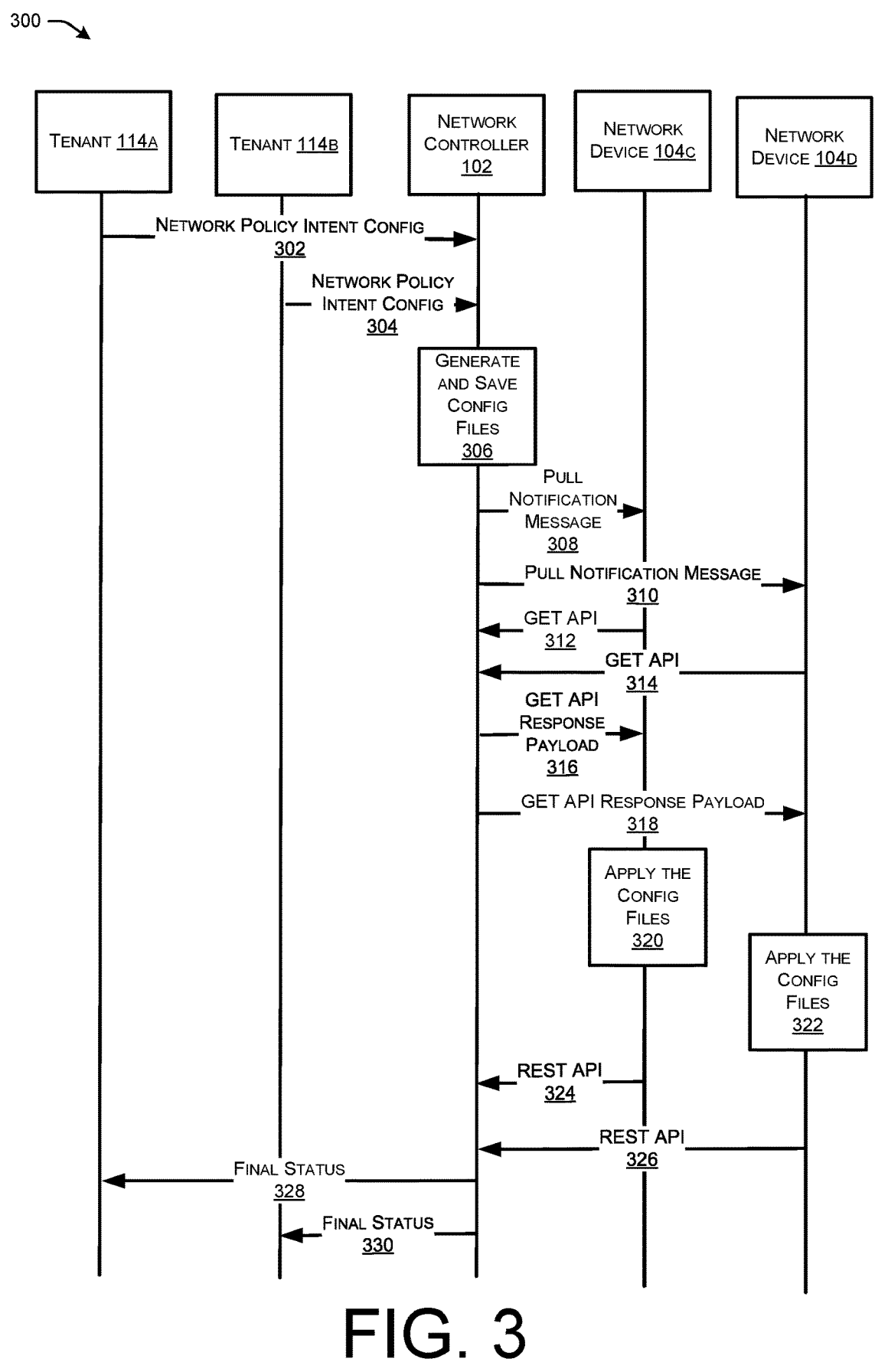

300 ⟍

| TENANT 114A | TENANT 114B | NETWORK CONTROLLER 102 | NETWORK DEVICE 104C | NETWORK DEVICE 104D |
|---|---|---|---|---|

NETWORK POLICY INTENT CONFIG
302

NETWORK POLICY INTENT CONFIG
304

GENERATE AND SAVE CONFIG FILES
306

PULL NOTIFICATION MESSAGE
308

PULL NOTIFICATION MESSAGE
310

GET API
312

GET API
314

GET API RESPONSE PAYLOAD
316

GET API RESPONSE PAYLOAD
318

APPLY THE CONFIG FILES
320

APPLY THE CONFIG FILES
322

REST API
324

REST API
326

FINAL STATUS
328

FINAL STATUS
330

FIG. 3

400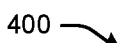

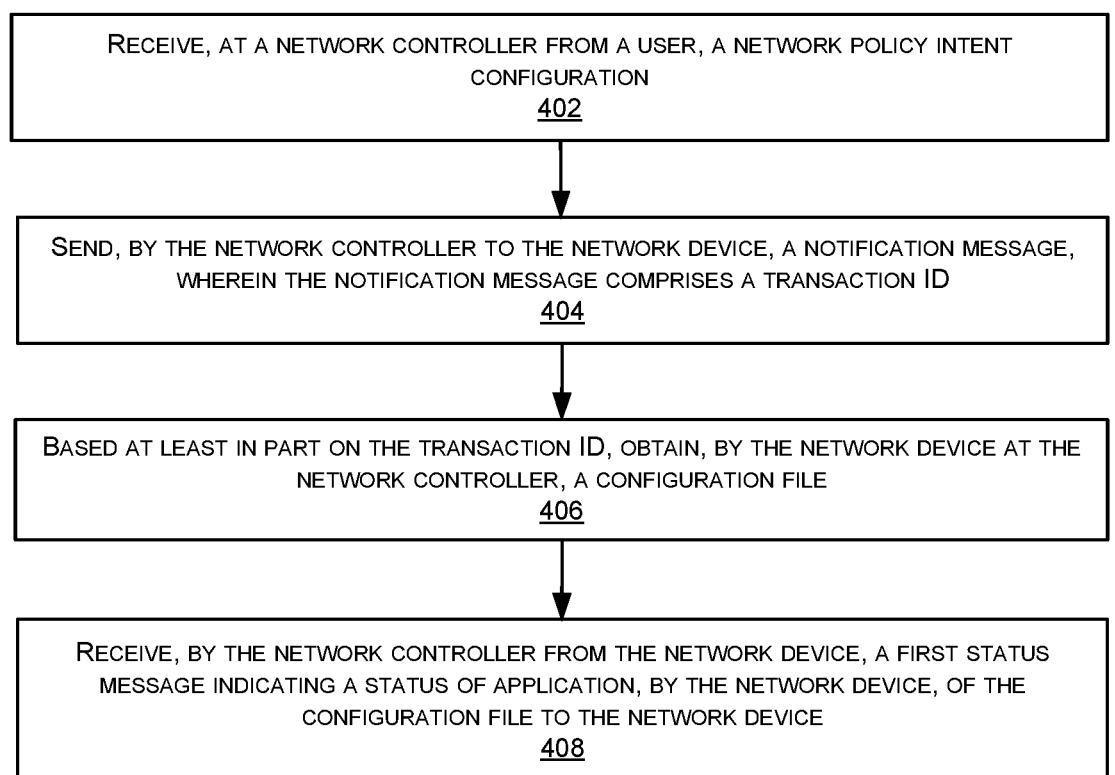

RECEIVE, AT A NETWORK CONTROLLER FROM A USER, A NETWORK POLICY INTENT CONFIGURATION
402

SEND, BY THE NETWORK CONTROLLER TO THE NETWORK DEVICE, A NOTIFICATION MESSAGE, WHEREIN THE NOTIFICATION MESSAGE COMPRISES A TRANSACTION ID
404

BASED AT LEAST IN PART ON THE TRANSACTION ID, OBTAIN, BY THE NETWORK DEVICE AT THE NETWORK CONTROLLER, A CONFIGURATION FILE
406

RECEIVE, BY THE NETWORK CONTROLLER FROM THE NETWORK DEVICE, A FIRST STATUS MESSAGE INDICATING A STATUS OF APPLICATION, BY THE NETWORK DEVICE, OF THE CONFIGURATION FILE TO THE NETWORK DEVICE
408

FIG. 4

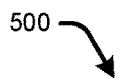
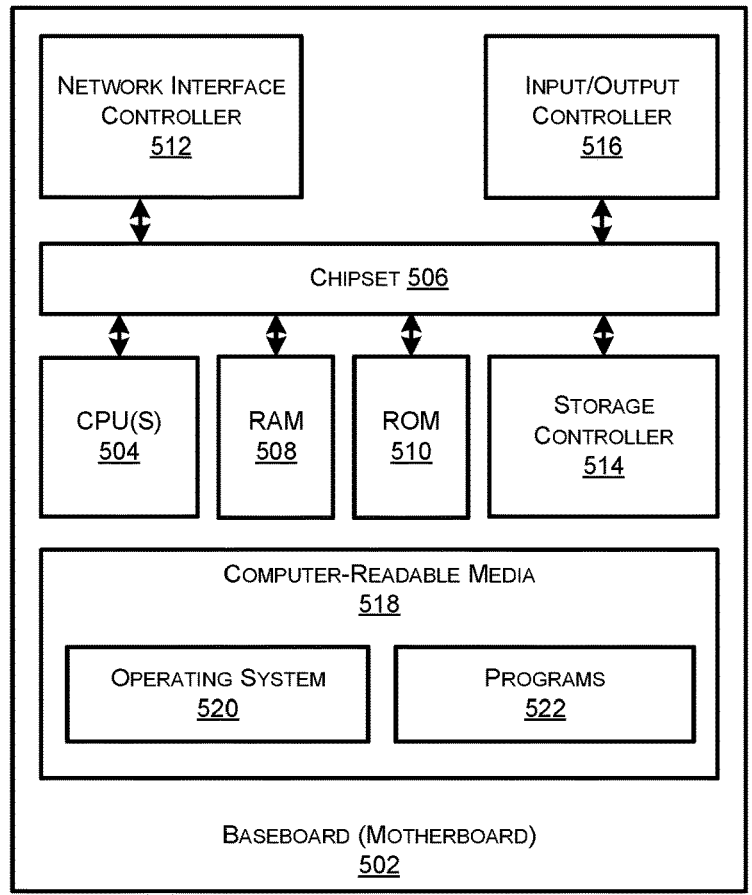
FIG. 5

DISTRIBUTION OF INTENT BASED NETWORK CONFIGURATION OF NETWORK DEVICES INCLUDING MULTI-TENANT NETWORK DEVICES

CROSS-REFERENCE TO RELATED APPLICATION

This patent application claims priority to U.S. Provisional Patent Application No. 63/400,471, filed Aug. 24, 2022, which is fully incorporated herein by reference.

TECHNICAL FIELD

The present disclosure relates generally to providing configuration files to network devices of a network and more particularly, to providing configuration files to network devices asynchronously using a pull model, where the network devices may also be multi-tenant network devices.

BACKGROUND

Large networks, such as, for example, software defined wide area networks (SDWANs), may include on the order of tens of thousands of edge network devices, e.g., routers. Controllers for such large SDWAN networks need to deploy configuration changes to these edge devices. Users often have a single intent that they typically deliver to a large number of their branch sites. Current SDWAN networks need to support many different use cases ranging from mobility, hybrid-work, Internet of things (IoT), etc., which all require support for increased network size, device scale, and faster response times for users and network administrators (admins). Network admins generally want to ensure that all end devices managed by a controller are able to achieve the "end state" configuration in the shortest time possible. Traditional approaches such as, for example, secure shell (SSH), network configuration protocol (netconf), remote procedure call (RPC) mechanisms of delivering configuration files to edge routers suffer from severe drawbacks that limit their scalability as networks grow. The nature of these traditional protocols causes, for example, (i) a large delay in network convergence time if one or more devices are unresponsive or slow in applying the configuration file, (ii) controller resources being wasted in more network bound operations, (iii) larger config files being more vulnerable to wasted resources and overall convergence delays, (iv) several back-and-forth interactions between the controller and an edge device, and (v) converge time and controller cloud hosting costs exponentially increasing with edge device scale. This may cause an increase in maintenance windows for users and increased frustration and decreased confidence in an ability to effectively deliver network configurations. A large network may get extended exposure to security vulnerabilities due to high configuration convergence times.

Additionally, in current SDWAN deployments, the SDWAN deployments are leveraged by many service providers to provide managed service offerings to their users. These managed service providers (MSPs) search for multi-tenant aware solutions that may be onboarded for their users as tenants and provide the users the freedom to configure their edge network devices. The MSPs also want to allow tenants to provision their own control and traffic policies on shared (control plane) devices. A large MSP may have several hundred tenants sharing the same management plane and control plane controller devices. This poses challenges when these tenants try to change policy configurations on their control plane network devices concurrently. Traditional network devices and current configuration delivery mechanisms are not built and/or configured to handle such concurrency.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIGS. 2 and 3 schematically illustrate example flows of using the pull model described herein for obtaining configuration changes and implementing the configuration changes on network devices in a network, in accordance with the techniques and architecture described herein.

FIG. 4 illustrates a flow diagram of an example method for using a pull model to obtain configuration changes for implementing the configuration changes on network devices in a network, in accordance with the techniques and architecture described herein.

FIG. 5 is a computer architecture diagram showing an example computer hardware architecture for implementing a device that can be utilized to implement aspects of the various technologies presented herein.

DESCRIPTION OF EXAMPLE EMBODIMENTS

Overview

Figure 1:
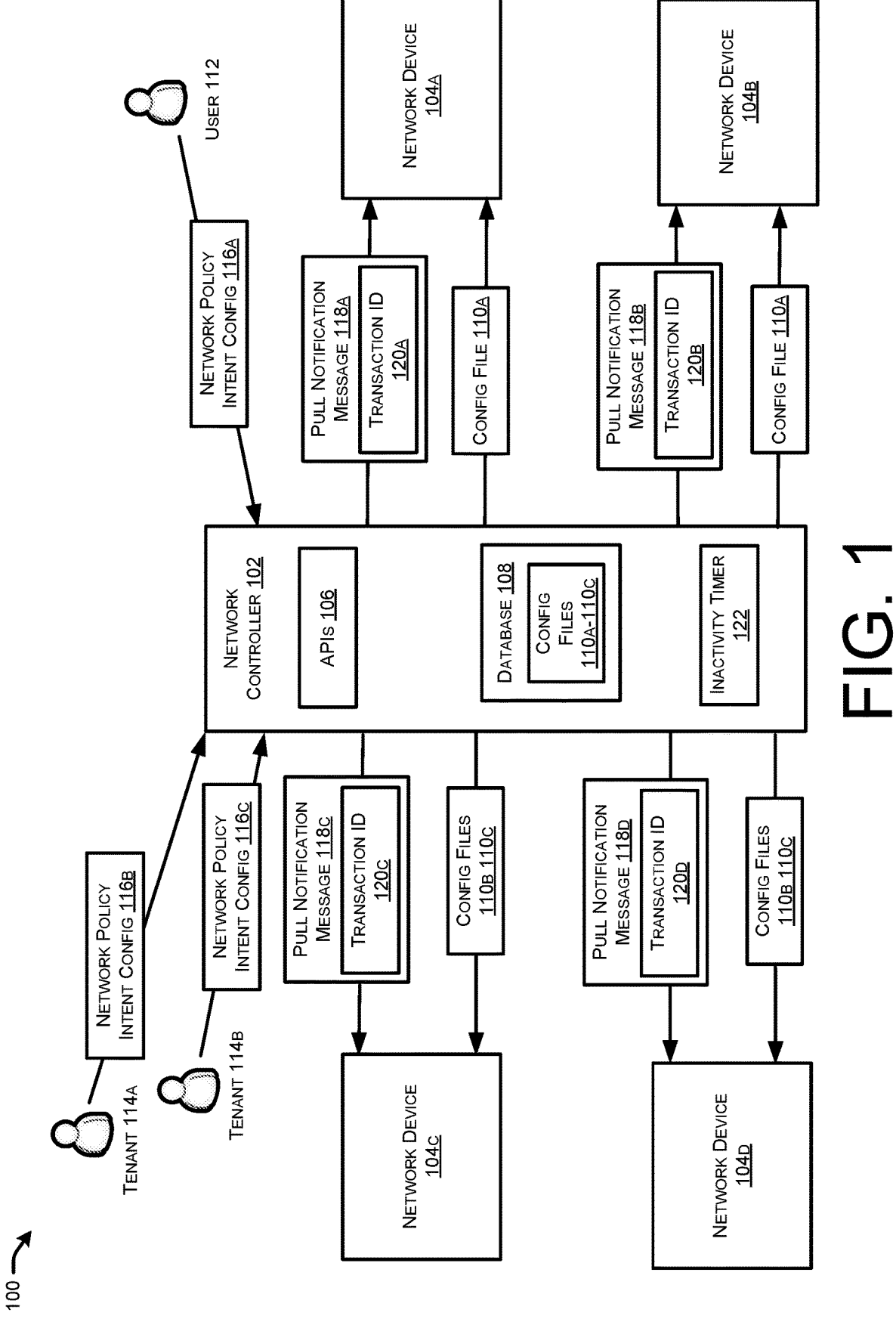
FIG. 1 schematically illustrates an example of a portion of a network, in accordance with techniques and architecture described herein.

The present disclosure describes techniques and architecture for providing configuration files to network devices of a network asynchronously using a pull model, where the network devices may also be multi-tenant network devices. In particular, in configurations intent-based network configuration files are delivered to edge devices of the network using the pull model described herein. Such a pull model scales better than current push-based configuration file delivery mechanisms such as, for example, command line interface (CLI) over secure shell (SSH) or extensible markup language (XML) over network configuration protocol (netconf)-remote procedure call (RPC) (netconf-RPC). The pull model described herein may also be extended to use external services such as a content delivery network (CDN) for configuration delivery, thereby increasing the controller scale even further. This mechanism of using a pull model of configuration delivery provides an improved performance and scale of configuration (config) deployments, e.g., config file deployments.

As an example, a method may comprise receiving, by a network controller from a user, a network policy intent configuration for a network device. The method may further comprise sending, by the network controller to the network device, a notification message. In configurations, the notification message comprises a transaction identification (ID). The method may further comprise based at least in part on the transaction ID, obtaining, by the network device at the network controller, a configuration file. The method may also comprise receiving, by the network controller from the network device, a first status message indicating a status of application, by the network device of the configuration file to the network device. In configurations, the first status message comprises the transaction ID.

Example Embodiments

In accordance with the configurations, as previously noted, intent-based network configuration files are delivered to edge devices of a network using a pull model described herein. Such a pull model scales better than current push-based configuration file delivery mechanisms such as, for example, command line interface (CLI) over secure shell (SSH) or extensible markup language (XML) over network configuration protocol (netconf)-remote procedure call (RPC) (netconf-RPC). The pull model described herein may also be extended to use external services such as a content delivery network (CDN) for configuration delivery, thereby increasing the controller scale even further. This mechanism of using a pull model of configuration delivery provides an improved performance and scale of configuration (config) deployments, e.g., config file deployments.

More particularly, delivering user intent to network devices via a network controller using a pull model as described herein generally involves two particular operations. A first operation may include conversion of intent to a configuration or format that the network device understands. A second operation may include delivery of this configuration to the network device. The pull model method described herein focuses primarily on the delivery portion for the intent. Current software defined networking technologies generally focus on the use of netconf over SSH (or even just standard SSH) to transmit traditional operating system CILs to network edge devices. Drawbacks of such approaches include, for example, that the approaches are synchronous in nature. Additionally, idle wait for the network controller while the network devices are applying the config file and performing operations related to the config file. This generally results in a wastage of network controller resources. Furthermore, connection loss during config file delivery or application requires extra overhead on the network controller to determine a status of a configuration transaction. Additionally, several interactions or back and forth between the network controller and the network device are needed to deliver the config file. This is especially true in scenarios including download of container or virtual network function (VNF) images to apply the config file.

Netconf is completely synchronous in nature and thus, it suffers from controller resources being tied up with network device processing. While restconf may be a potential improvement over netconf, restconf also suffers from several drawbacks. For example, when the network device switches a config file from a network controller, the network device needs to apply the config file in the context of the same HTTP thread. The network device may take a long time to apply the config file and the network controller resources may still be blocked for that period of time. It has been observed that network devices may take a long time to apply large config files or download VNF images, etc., as part of config file applications.

The pull model described herein addresses these shortcomings by utilizing asynchronous interaction between the network controller and network devices. An example of a sequence of interaction between the network devices and the network controller may include a user submitting intent configuration (config) to the network controller that needs to be delivered to several network sites, e.g., network edge devices. The network controller generates and saves a config file in its local database. The network controller sends a pull notification message to all network devices that need to retrieve or "fetch" the config file. This pull notification message only contains a corresponding transaction ID for each network device and a location, e.g., address or identifier, for the network device to use to pull the config file. This pull notification message may be sent, for example, via representational state transfer (REST), g remote procedure call (gRPC), netconf, etc. Since the pull notification message contains only one ID and an address or identifier, minimal processing is required for this interaction. In configurations, the network device may acknowledge the receipt of the pull-notification message.

In configurations, the network devices may utilize a HTTP REST application programming interface (API) exposed by the network controller to obtain or fetch the config file from the network controller. For example, the network devices may utilize GET/device/config/{transaction-ID} to fetch the config file from the network controller. Since the network devices are already authenticated and have a control channel established, the network devices may safely pull this config file from network controllers via the HTTP REST API. The GET API response payload contains all the necessary information needed by the network devices to fully apply the configuration, e.g., the config file. The GET API response also contains necessary metadata in case the network devices need to download from software images, e.g., for a unified threat defense (UTD) security virtual image container, etc., before the network devices may apply the config file. The network devices may then apply the config file and download images if needed.

The network devices may then utilize another REST API exposed by the network controller to reply back with a final status of the configuration transaction. For example, the network devices may utilize PUT/device/config/{transaction-ID}/status to reply back to the network controller with the final status of the configuration transaction. In configurations, the network devices may also send interim "in-progress" updates to the controller. The network controller may then relay the network devices' statuses back to the user against the per-device transactions that the network controller maintains in its database.

In configurations, the network controller may include an inactivity timer that maintains an "inactivity time out" to protect against unresponsive network devices. For example, if no status has been received at the network controller from a particular network device after, for example, 30 minutes, then, after acknowledging a "pull-notification", if the particular network device has not pulled the config file, the network controller fails the device transaction and invalidates the transaction ID. Similarly, if the network device does not respond with any PUT status message (either in-progress or success/failure) within 30 minutes of pulling the config file, the network controller may timeout the transaction. The inactivity timer may be initiated as soon as the network controller delivers the pull-notification message and the inactivity timer may be reset every time the network device responds with a status message.

Accordingly, based on the above interaction, it can be seen that the pull-model described herein provides significant benefits over traditional config file delivery approaches. For example, all interactions between the network controller and the network device are designed to be asynchronous. Additionally, network controller resources are not bound to network devices, the network input/output (I/O), etc. There are no idle waits on the network controller while the network device applies the config file. Connection failures while applying the config file on a network device do not have any negative performance impact on the negative controller. Since all modern edge devices used in most networks, e.g., SDWAN, already have established rollback mechanisms, such edge devices may simply respond back with a final status after the control connection is re-established, even in failure scenarios. Additionally, any extra or external interactions to download images, etc., before applying the config file (or any sequencing operations as such) also do not involve status tracking by the network controller. Furthermore, network controllers can also now scale tremendously by potentially offloading configurations to a CDN-like system from which network devices may pull the config files. Thus, the pull model approach described herein scales orders of magnitude better than Netconf. Additionally, the pull model reduces resources needed on the network controller significantly thereby reducing overall operating expenses (OPEX) for hosting network controllers.

The pull model approach described herein uses a transaction ID that is part of every interaction. Due to this, the network device simply needs to cache or save the config file locally and return an HTTP reply, preferably immediately. In configurations, the network device may apply the config file later and use the PUT API to notify the network controller of the final status using the transaction ID. Additionally, while the network device is applying the config file, the control connection between the network device and the network controller may fail, e.g., go down. Tracking the status of the last config file requires additional resources and complexity on both the part of the network controller and the network device. By using a transaction ID and a separate PUT REST API, these problems are avoided in the pull model. In configurations, the network device may only notify the network controller after the control is re-established. Network controller resources are thus not wasted in trying to poll the device from the status of the configuration operation.

As an example, a push-based config file delivery system, e.g., SSH, netconf, etc., may deliver configuration files to 8,192 network devices. If the time taken by each network device to process the config file is assumed to be 5 minutes, and the number of network controller threads (for config file generation and delivery) is assumed to be 16, then the number of batches equals 8192/16=512. The total time would thus be 512×5, which equals 2560 minutes, which is approximately equal to 43 hours. In contrast, the config file pull-based model delivery as described herein with the same number of network devices (8,192) and the same amount of time taken by each network device to process the config file (5 minutes), with a time for pull notification equal to 1 second and the number of network controller threads equaling 16, then the number of batches equals 8192/16, which equals 512. Thus, the total time is equal to 512×1 plus 5×60 which equals 812 seconds, which is approximately equal to 14 minutes.

An enterprise managed service provider (MSP) may have several tenants that share the same network device (e.g., control-plane) for configuring their network policies. In the past, the management and delivery of such config files was very restrictive. Either the service provider has to manage the entire config files themselves, or even if they provide access to tenants, the config file applications need to be serialized, i.e., multiple tenants may not concurrently modify their own network policy configurations. The entire flow all the way from the user intent, any processing in the network controller, passed down to the network device, saving to persistent storage, and acknowledgement back to the network controller is generally treated as a synchronous transaction for consistency purposes. However, when multiple tenants attempt to express their intent concurrently, this push model introduces a level of serialization across the tenants. The performance of the system degrades as the size of the config operation grows larger.

To solve problems related to multi-tenant configuration of network devices, the pull model approach for config file delivery described herein may be extended to the multi-tenant configuration operation. As previously described, the pull-model based delivery approach described herein notifies the network devices whenever any user does an intent configuration (config) change on the management plane. This is a short notification that is not a function of the size of the config file. The network devices may use REST APIs to retrieve (fetch) the config file from the network controller and to update (PUT) the status of the config transaction on the network device. This may be done in parallel across tenants.

Architecture may also take care of optimizing config file delivery and may be configured to reduce resource usage on the network controller, thereby reducing OPEX. For example, if multiple tenants change intent at the same time, the network controller may request config change for multiple tenants with a single pull request instead of doing one per tenant. The pull model described herein provides the ability for the control plane to scale better by distributing tenants and the pull model may also allow moving a tenant from one network device to another. Thus, it is possible to achieve true multi-tenancy at the control plane level with shared network controllers and be able to isolate each transaction per tenant and provide higher performance.

As an example, tenant one logs into the network management plane (e.g., the network controller) and makes a change in network policy intent configuration for the network devices on which tenant A operates. Tenant B also logs into the network management plane and makes a change to network policy intent configuration in the network management plane for the network devices on which tenant B operates, which for this example are the same network devices on which tenant A operates. Both tenant A and tenant B ask the network controller to deliver their changes, e.g., config files, to the control plane, e.g., the network devices. The network controller generates two transaction IDs. A first transaction ID is for the configuration changes for tenant A and the second transaction ID is for the configuration changes for tenant B. The network controller may then send two pull notification messages to each network device, e.g., one per tenant, where the pull notification message corresponding to tenant A includes the first transaction ID and the pull notification message corresponding to tenant B includes the second transaction ID. In configurations, a single pull notification may be sent to each network device that indicates the need to pull both config files and thus includes both transaction IDs.

In configurations, the network devices may acknowledge the pull notifications. The network devices may then fetch the config files for the first tenant changes and the second tenant changes from the network controller, e.g., from a local database of the network controller. The network controller may expose HTTP GET APIs that are tenant aware so that the network devices can pull the config files independently. The network devices may now apply or merge the config changes of the config files that the network devices receive for the different tenant transactions. The network devices can send responses via the HTTP PUT APIs exposed by the network controller. The status responses may also be per transaction and per tenant. The network controller can notify each tenant user, e.g., tenant A and tenant B, independently about the status of their configuration changes.

Such a pull model for multiple tenant network devices allows for configuration changes to be tenant managed. Service providers allow tenants to manage their own configuration policies. Additionally, concurrency is provided since all tenants can make their changes and submit them concurrently. Even if network devices want to serialize the configuration application, the network devices can still pull configuration files together and queue them locally. Network controller resources are not utilized in queuing up any tenant requests and thus, network controller resources can be scaled and their resources utilized efficiently.

Thus, in configurations, a method comprises receiving, by a network controller from a user, a network policy intent configuration for a network device. The method further comprises sending, by the network controller to the network device, a notification message. In configurations, the notification message comprises a transaction identification (ID). The method also comprises based at least in part on the transaction ID, obtaining, by the network device at the network controller, a configuration file. The method further comprises receiving, by the network controller from the network device, a first status message indicating a status of application, by the network device of the configuration file to the network device. In configurations, the first status message comprises the transaction ID.

In configurations, obtaining the configuration file comprises using a first exposed representational state transfer (REST) application programming interface (API) at the network controller and receiving the status message indicating the status of application of the configuration file to the network device comprises using a second exposed REST API at the network controller.

In configurations, the method further comprises maintaining, by the network controller an inactivity timer and based at least in part on receiving the first status message, resetting, by the network controller the inactivity timer. In configurations, the method also comprises based at least in part on expiration of the inactivity timer, sending, by the network controller to the user, a message indicating failure of application of the configuration file to the network device.

In configurations, based at least in part on the first status message, the method further comprises sending, by the network controller to the user, a second status message indicating the status of application of the configuration file to the network device.

In configurations, the network device is a first network device, the transaction ID is a first transaction ID, and the notification message is a first notification message. Additionally, receiving the network policy intent configuration is for the first network device and a second network device. In such configurations, the method further comprises sending, by the network controller to the second network device, a second notification, where the second notification message comprises a second transaction ID. Based at least in part on the second transaction ID, the second network device obtains the configuration file at the network controller. In configurations the method further comprises receiving by the network controller from the second network device, a second status message indicating a status of application, by the second network device, of the configuration file to the second network device, wherein the second status message comprises the second transaction ID.

In configurations, the user is a first user, the network policy intent configuration is a first network policy intent configuration, the notification message is a first notification message, the transaction ID is a first transaction ID, the configuration file is a first configuration file, and the method further comprises receiving, by the network controller from a second user, a network policy intent configuration for the network device. The method also comprises sending, by the network controller to the network device, a second notification message to the network device, where the second notification message comprises a second transaction ID. The method further comprises based at least in part on the second transaction ID, obtaining, by the network device at the network controller, a second configuration file. The method also comprises receiving, by the network controller from the network device, a second status message indicating a status of application, by the network device, of the second configuration file to the network device, where the second status message comprises the second transaction ID.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example portion of a network 100 that includes a network controller 102 and four network devices 102a, 102b, 102c, and 102d, e.g., routers, switches, etc. In configurations, the network 100 is configured as a software defined wise area network (SDWAN) and the network controller represents the vManage management plane and the network devices represent the vSmart control plane. As is known, the network 100 generally includes more network controllers 102 and network devices 104.

In configurations, the network controller 102 includes APIs 106 and a database 108 that stores, among other things, configuration (config) files 110. Network devices 104a and 104b are utilized by user 112. Network devices 104c and 104d are utilized by tenants 114a and 114b.

In configurations, the user 112 may submit network policy intent configuration (config), 116a to the network controller 102 that needs to be delivered to several network sites, e.g., network edge devices such as network devices 104a, 104b. For example, the user 112 may log into the network controller 102 and make a change via network policy intent configuration 116a for the network devices 104a, 104b. The network controller 102 generates and saves a corresponding config file 110a in its local database 108. The network controller 102 sends a pull notification message 118a to the network device 104a and a pull notification message 118b to the network device 104b indicating that they need to retrieve or "fetch" the config file 110a. The pull notification messages 118a, 118b only contain a transaction ID 120a, 120b for the corresponding network device 104a, 104b and a location, e.g., address or identifier, for the network devices 104a, 104b to use to pull the config file 110a. The pull notification messages 118a, 118b may be sent, for example, via representational state transfer (REST), g remote procedure call (gRPC), netconf, etc. Since the pull notification messages 118a, 118b contains only one transaction ID (120a or 120b) and an address or identifier, minimal processing is required for this interaction. In configurations, the network devices 104a, 104b may acknowledge the receipt of the pull-notification messages 118a, 118b.

In configurations, the network devices 104a, 104b may utilize a HTTP REST application programming interface 9                                           10

(API) of the APIs 106 exposed by the network controller 102 to obtain or fetch the config file 110*a* from the network controller 102. For example, the network devices 104*a*, 104*b* may utilize GET/device/config/{transaction-ID} to fetch the config file 110*a* from the network controller 102. Since the network devices 104*a*, 104*b* are already authenticated and have a control channel established, the network devices 104*a*, 104*b* may safely pull the config file 110*a* from the network controller 102 via the HTTP REST API. A GET API response payload from the network controller 102 contains all the necessary information needed by the network devices 104*a*, 104*b* to fully apply the configuration, e.g., the config file 110*a*. The GET API response also contains necessary metadata in case the network devices 104*a*, 104*b* need to download from software images, e.g., for a unified threat defense (UTD) security virtual image container, etc., before the network devices 104*a*, 104*b* may apply the config file 110*a*. The network devices 104*a*, 104*b* may then apply the config file and download images if needed.

The network devices 104*a*, 104*b* may utilize another REST API exposed by the network controller 102 to reply back with a final status of the configuration transaction. For example, the network devices 104*a*, 104*b* may utilize PUT/device/config/{transaction-ID}/status to reply back to the network controller 102 with the final status of the configuration transaction. In configurations, the network devices 104*a*, 104*b* may also send interim "in-progress" updates to the network controller 102. The network controller 102 may relay the network devices' statuses back to the user 112 against per-device transactions that correspond to the transaction IDs 120*a*, 120*b* that the network controller 102 maintains in its database 108.

In configurations, the network controller 102 may include an inactivity timer 122 that maintains an "inactivity time out" to protect against unresponsive network devices 104. For example, if no status has been received at the network controller 102 from network device 104*a* and/or 104*b* after, for example, 30 minutes, then, after acknowledging a "pull-notification" by the network device 104*a* and/or 104*b*, if one or both of network devices 104*a*, 104*b* has not pulled the config file 110*a*, the network controller 102 may fail the corresponding device transaction and invalidates the corresponding transaction ID 102*a*, 120*b*. Similarly, if the network devices 104*a* and/or 104*b* do not respond with any PUT status message (either in-progress or success/failure) within 30 minutes of pulling the config file 110*a*, the network controller 102 may timeout the transaction. The inactivity timer 122 may be initiated as soon as the network controller 102 delivers the pull-notification messages 118 and the inactivity timer 122 may be reset every time the network devices 104 responds with a status message.

As previously noted, an enterprise managed service provider (MSP) may have several tenants, e.g., tenants 114*a*, 114*b* that share the same network devices, e.g., network devices 104*c*, 104*d*, for configuring their network policies. In configurations, tenant 114*a* logs into network controller 102 and makes a change via network policy intent configuration 116*b* for the network devices 104*c*, 104*d* on which tenant 114*a* operates. Tenant 114*b* also logs into the network controller 102 and makes a change via the network policy intent configuration 116*c* in the network controller 102 for the network devices 104*a*, 104*b* on which tenant 114*b* operates, which for this example are the same network devices on which tenant 114*a* operates. Both tenant 114*a* and tenant 114*b* ask the network controller 102 to deliver their changes, e.g., config file 110*b* for network policy intent configuration 116*b* and config file 110*c* for network policy intent configuration 116*c*, to the network devices 104*c*, 104*d*. The network controller 102 generates two transaction IDs 120*c*, 120*d*. The first transaction ID 120*c* is for the configuration changes for tenant 114*a* and the second transaction 120*d* is for the configuration changes for tenant 114*b*. The network controller 102 may then send two pull notification messages 118*c*, 118*d* to each network device 104*c*, 104*d*, e.g., one per tenant, where the pull notification message 118*c* corresponding to tenant 114*a* includes the first transaction ID 120*c* and the pull notification message 118*d* corresponding to tenant 114*b* includes the second transaction 120*d*. In configurations, a single pull notification message may be sent to each network device 104*a*, 104*b* that indicates the need to pull both config files 110*b*, 110*c* and thus includes both transaction IDs 120*c*, 120*d*.

In configurations, the network devices 104*c*, 104*d* may acknowledge the pull notification messages 118*c*, 118*d*. The network devices 104*c*, 104*d* may then fetch the config files 110*b*, 110*c* for the first tenant changes and the second tenant changes from the local database 108 of the network controller 102. The network controller 102 may expose HTTP GET APIs as previously described herein that are tenant aware so that the network devices 104*c*, 104*d* can pull the config files 110*b*, 110*c* independently. The GET API responses payload from the network controller 102 contain all the necessary information needed by the network devices 104*c*, 104*c* to fully apply the configurations, e.g., the config files 110*b*, 110*c*. The GET API responses also contain necessary metadata in case the network devices 104*c*, 104*d* need to download from software images, e.g., for a unified threat defense (UTD) security virtual image container, etc., before the network devices 104*s*, 104*d* may apply the config files 110*b*, 110*c*. The network devices 104*c*, 104*d* may now apply (or merge and then apply) the config changes of the config files 110*b*, 110*c* that the network devices 104*c*, 104*d* receive for the different tenant transactions and download images if needed. In configurations, the GET API responses may include all tenant configs merged into a single payload as will be described further herein.

The network devices 104*c*, 104*d* can send status responses to the network controller 102 via the HTTP PUT APIs exposed by the network controller 102 as previously described herein. The status responses may also be per transaction and per tenant. The network controller 102 can notify each tenant 114*a* and tenant 114*b*, independently about the status of their configuration changes. The inactivity timer 122 may also be used for each transaction, as previously described herein.

An example of a GET/device/config/{transactionId} REST API configuration is:

```
1.    {
2.        "requests": [
3.        {
4.            "tenant": "tenant-id-114a",
5.            "transactionId": "tid-1"
6.        }
7.        ]
8.    }
```

An example of a response configuration to the GET API is:

```
 1.        {
 2.          "configs": [
 3.            {
 4.              "tenant": "tenant-id-1",
 5.              "config": {
 6.                "data": <config-xml-in-base64>,
 7.                "id": "config-id-1",
 8.                "version": "config-ver-1"
 9.              }
10.              "metadata": { }
11.            }
12.          ]
13.        }
```

An example of a PUT/device/config/status/{transactionId} configuration is:

```
 1.        {
 2.          "status": [
 3.            {
 4.              "tenant": "tenant-id-1",
 5.              "status": "success",
 6.              "detail": "success detail if any",
 7.            }
 8.        }
```

One skilled in the art can also modify the above examples for use in the non-multi-tenant scenario described herein with respect to network devices 104a, 104b.

Figure 2:
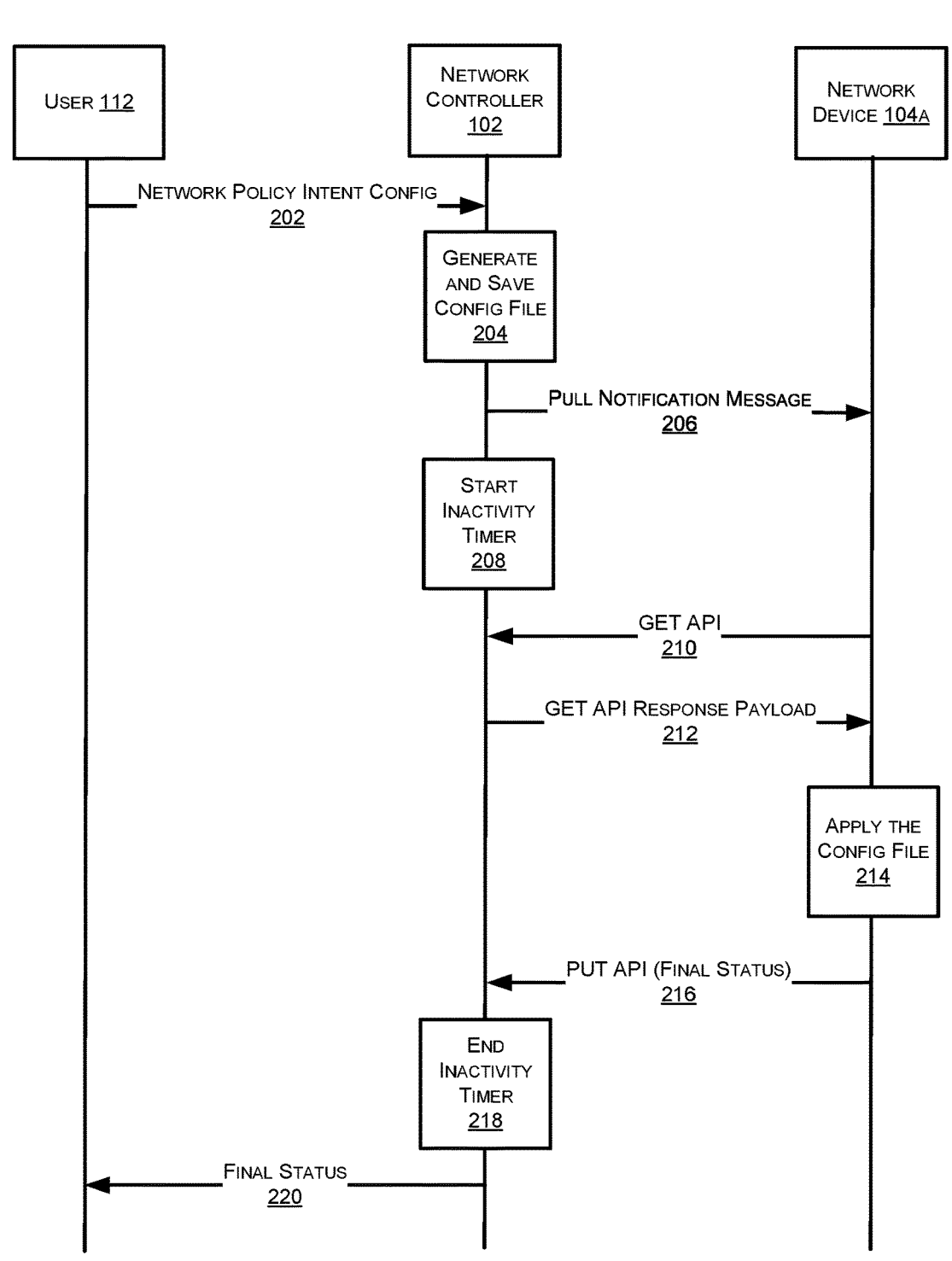

FIG. 2 schematically illustrates an example flow 200 of using the pull model described herein for obtaining configuration changes and implementing the configuration changes, e.g., using config file 110a, on network devices, e.g., network devices 104a and 104b. At 202, user 112 submits network policy intent configuration (config) to the network controller 102 that needs to be delivered to several network sites, e.g., network edge devices, such as network devices 104a, 104b. In the example of FIG. 2, only network device 104a is included. At 204, the network controller 102 generates and saves a corresponding config file in its local database.

At 206, the network controller 102 sends a pull notification message to the network device 104a indicating that it needs to retrieve or "fetch" the config file. As previously noted, the pull notification message only contains a transaction ID for the network device 104a and a location, e.g., address or identifier, for the network device 104a to use to pull the config file. The pull notification message may be sent, for example, via representational state transfer (REST), g remote procedure call (gRPC), netconf, etc. Since the pull notification messages contains only one transaction ID (120a) and an address or identifier, minimal processing is required for this interaction. At 208, the network controller 102 starts the inactivity timer.

At 210, the network device 104a utilizes a HTTP GET REST API exposed by the network controller 102 to obtain or fetch the config file from the network controller 102. For example, the network device 104a may utilize GET/device/config/{transaction-ID} to fetch the config file from the network controller 102. Since the network device 104a is already authenticated and has a control channel established, the network device 104a may safely pull the config file from the network controller 102 via the HTTP GET REST API. At 212, a GET API response payload from the network controller contains all the necessary information needed by the network device 104a to fully apply the configuration, e.g., the config file. The GET API response also contains necessary metadata in case the network device 104a needs to download from software images, e.g., for a unified threat defense (UTD) security virtual image container, etc., before the network device 104a may apply the config file 110a. At 214, the network device 104a applies the config file and downloads images if needed.

At 216, the network device 104a utilizes a PUT REST API exposed by the network controller 102 to reply back with a final status of the configuration transaction. For example, the network device 104a may utilize PUT/device/config/{transaction-ID}/status to reply back to the network controller 102 with the final status of the configuration transaction. At 218, the network controller ends the inactivity timer. At 220, the network controller 102 relays the network device's status of success or failure back to the user 112 against a per-device transaction that corresponds to the transaction ID for the network device 104a that the network controller 102 maintains in its database.

FIG. 3 schematically illustrates an example flow 300 of using the pull model described herein for obtaining configuration changes and implementing the configuration changes, e.g., using config files 110b and 110c, on network devices, e.g., network devices 104c and 104d. At 302, tenant 114a logs into network controller 102 and makes a change in network policy intent configuration for the network devices 104c, 104d on which tenant 114a operates. At 304, tenant 114b also logs into the network controller 102 and makes a change to network policy intent configuration in the network controller 102 for the network devices 104a, 104b on which tenant 114b operates, which for this example are the same network devices on which tenant 114a operates. At 306, the network controller 102 generates a config file for each network policy intent configuration, one for tenant 114a's changes and one for tenant 114b's changes.

At 308 and 310, the network controller 102 sends two pull notification messages to each network device 104c, 104d, e.g., one per tenant, to pull both config files, where the first pull notification message corresponding to tenant 114a includes a first transaction ID and the second pull notification message corresponding to tenant 114b includes a second transaction. In configurations, a single pull notification message may be sent to each network device 104a, 104b that indicates the need to pull both config files and thus includes both transaction IDs.

At 312 and 314, the network controller 102 exposes HTTP GET REST APIs that are tenant aware so that the network devices 104c, 104d can pull the config files independently. At 316 and 318, the GET API responses payload from the network controller 102 contain all the necessary information needed by the network devices 104c, 104c to fully apply the configurations, e.g., the config files 110b, 110c. The GET API responses also contain necessary metadata in case the network devices 104c, 104d need to download from software images, e.g., for a unified threat defense (UTD) security virtual image container, etc., before the network devices 104s, 104d may apply the config files 110b, 110c. The network devices 104c, 104d may now apply or merge the config changes of the config files 110b, 110c that the network devices 104c, 104d receive for the different tenant transactions and download images if needed. At 320 and 322, the network devices 104c, 104d applies (or merges and then applies) the config changes of the config files that the network devices 104c, 104d receive for the different tenant transactions. At 324 and 326, the network devices 104c, 104d sends status responses to the network controller

102 via HTTP PUT APIs exposed by the network controller 102. The status responses may also be per transaction and per tenant. At 328, the network controller 102 notifies each tenant 114a and tenant 114b, independently about the status of their configuration changes. While not shown in the flow 300 of FIG. 3, the inactivity timer 122 may also be used for each transaction, as previously described herein.

There are two approaches to achieve concurrent config handling for multiple tenants. Both of these may also be implemented together. A first approach utilizes the network controller 102 and a second approach uses the network devices 104c, 104d.

For the first approach, the network controller 102 may merge all the tenant configs into a single payload. Referring to FIG. 3, the network controller 102 may send, at 314 and can automatically merge all of them before sending it down to the lower layers in the operating system (OS) (i.e. confd, IOSd etc).

For the second approach, when network devices 104c, 104d receive a pull notification from the network controller 102, the network devices 104c, 104d can also wait to see if they receive more notifications within a timeout period. If the network devices 104c, 104d do indeed receive more config pull notifications 118 from the network controller 102, then they can request all the config files of all tenant transactions via a single GET request to the network controller 102. After this, the same merging process on the network devices as described previously apply at 318 and 320.

An example of a merged response configuration to the GET API is:

```
1.   tenant "114a"
2.   policy
3.   sla-class ssl-application
4.   loss 5
5.   latency 100
6.   jitter 50
7.   !
8.   data-policy __vpn__1__test__GM__ASK__policy__aar__dp__p__vpn__1
9.   vpn-list vpn__1
10.  ...
11.  !
12.  !
13.  tenant "114b"
14.  policy
15.  data-policy __ve1__vpn1__list__test__plp__policer__datapolicy__ve1__vpn1__list
16.  vpn-list ve1__vpn1__list
17.  sequence 1001
18.  match
19.  protocol 1
20.  !
21.  action accept
22.  count exceed__remark__icmp__seq__1001__cnt
23.  set
24.  policer policer1__ve1
25.  vpn 1
26.  tloc-list tenant2__tloc
27.  !
28.  !
29.  !
30.  lists
31.  vpn-list ve1__vpn1__list
32.  vpn 1
33.  ....
34.  !
```

316, a single pull notification message 118 to the network devices 104c, 104d that has two transaction IDs rather than one pull notification message 118 at a time. Thus, if multiple tenants have modified the config in the network controller 102, the network controller 102 may combine all of its responses into a single GET API response payload. Since multiple tenants generally open different HTTP/REST sessions into the network controller 102, the network controller 102 may choose to notify the network devices 104c, 104d using a single pull notification message 118 rather than different pull notification messages 118 per tenant. The single pull notification message 118 may contain different transaction-IDs per tenant to indicate to the network devices 104c, 104d that there are multiple config modifications. Further, in configurations, a config-manager daemon may be implemented on the network devices 104c, 104d that can handle the GET API responses coming in from the network controller 102. If the config-manager daemon sees that there are multiple tenant configs in the GET response, the daemon FIG. 4 illustrates a flow diagram of an example method 400 and illustrates aspects of the functions performed at least partly by devices of a network as described with respect to FIGS. 1-3. The logical operations described herein with respect to FIG. 4 may be implemented (1) as a sequence of computer-implemented acts or program modules running on a computing system, and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 4 and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

FIG. 4 illustrates a flow diagram of an example method 400 for using a pull model for obtaining configuration changes and implementing the configuration changes, e.g., using config files 110a, 110b, 110c, and/or 110d, on network devices, e.g., network devices 104a and 104b. In some examples, the method 400 may be performed by a system comprising one or more processors and one or more non-transitory computer-readable media storing computer-executable instructions that, when executed by the one or more processors, cause the one or more processors to perform the method 400.

At 402, a network controller receives, from a user, a network policy intent configuration for a network device. For example, the user 112 may submit network policy intent configuration (config) 116a to the network controller 102 that needs to be delivered to several network sites, e.g., network edge devices such as network devices 104a, 104b. The network controller 102 generates and saves a corresponding config file 110a in its local database 108.

At 404, the network controller sends, to the network device, a notification message, wherein the notification message comprises a transaction identification (ID). For example, the network controller 102 sends a pull notification message 118a to the network device 104a and a pull notification message 118b to the network device 104b indicating that they need to retrieve or "fetch" the config file 110a. The pull notification messages 118a, 118b only contain a transaction ID 120a, 120b for the corresponding network device 104a, 104b and a location, e.g., address or identifier, for the network devices 104a, 104b to use to pull the config file 110a. The pull notification messages 118a, 118b may be sent, for example, via representational state transfer (REST), g remote procedure call (gRPC), netconf, etc. Since the pull notification messages 118a, 118b contains only one transaction ID (120a or 120b) and an address or identifier, minimal processing is required for this interaction. In configurations, the network devices 104a, 104b may acknowledge the receipt of the pull-notification messages 118a, 118b.

At 406, based at least in part on the transaction ID, the network device obtains, at the network controller, a configuration file. For example, the network devices 104a, 104b may utilize a HTTP REST application programming interface (API) of the APIs 106 exposed by the network controller 102 to obtain or fetch the config file 110a from the network controller 102. For example, the network devices 104a, 104b may utilize GET/device/config/{transaction-ID} to fetch the config file 110a from the network controller 102. Since the network devices 104a, 104b are already authenticated and have a control channel established, the network devices 104a, 104b may safely pull the config file 110a from the network controller 102 via the HTTP REST API. A GET API response payload from the network controller 102 contains all the necessary information needed by the network devices 104a, 104b to fully apply the configuration, e.g., the config file 110a. The GET API response also contains necessary metadata in case the network devices 104a, 104b need to download from software images, e.g., for a unified threat defense (UTD) security virtual image container, etc., before the network devices 104a, 104b may apply the config file 110a. The network devices 104a, 104b may then apply the config file and download images if needed At 408, the network controller, receives, from the network device, a first status message indicating a status of application, by the network device, of the configuration file to the network device, wherein the first status message comprises the transaction ID. For example, the network devices 104a, 104b may utilize another REST API exposed by the network controller 102 to reply back with a final status of the configuration transaction. For example, the network devices 104a, 104b may utilize PUT/device/config/{transaction-ID}/status to reply back to the network controller 102 with the final status of the configuration transaction. In configurations, the network devices 104a, 104b may also send interim "in-progress" updates to the network controller 102. The network controller 102 may relay the network devices' statuses back to the user 112 against per-device transactions that correspond to the transaction IDs 120a, 120b that the network controller 102 maintains in its database 108.

Thus, the techniques and architecture described herein Accordingly, based on the above interaction, it can be seen that the pull-model described herein provides significant benefits over traditional config file delivery approaches. For example, all interactions between the network controller and the network device are designed to be asynchronous. Additionally, network controller resources are not bound to network devices, the network input/output (I/O), etc. There are no idle waits on the network controller while the network device applies the config file. Connection failures while applying the config file on a network device do not have any negative performance impact on the negative controller. Since all modern edge devices used in most networks, e.g., SDWAN, already have established rollback mechanisms, such edge devices may simply respond back with a final status after the control connection is re-established, even in failure scenarios. Additionally, any extra or external interactions to download images, etc., before applying the config file (or any sequencing operations as such) also do not involve status tracking by the network controller. Furthermore, network controllers can also now scale tremendously by potentially offloading configurations to a CDN-like system from which network devices may pull the config files. Thus, the pull model approach described herein scales orders of magnitude better than Netconf. Additionally, the pull model reduces resources needed on the network controller significantly thereby reducing overall operating expenses (OPEX) for hosting network controllers.

The pull model approach described herein uses a transaction ID that is part of every interaction. Due to this, the network device simply needs to cache or save the config file locally and return an HTTP reply, preferably immediately. In configurations, the network device may apply the config file later and use the PUT API to notify the network controller of the final status using the transaction ID. Additionally, while the network device is applying the config file, the control connection between the network device and the network controller may fail, e.g., go down. Tracking the status of the last config file requires additional resources and complexity on both the part of the network controller and the network device. By using a transaction ID and a separate PUT REST API, these problems may be avoided. In configurations, the network device may only notify the network controller after the control is re-established. Network control resources are thus not wasted in trying to poll the device from the status of the configuration operation.

Such a pull model for multiple tenant network devices allows for configuration changes to be tenant managed. Service providers allow tenants to manage their own configuration policies. Additionally, concurrency is provided since all tenants can make their changes and submit them concurrently. Even if network devices want to serialize the configuration application, the network devices can still pull configuration files together and queue them locally. Network controller resources are not utilized in queuing up any tenant requests and thus, network controller resources can be scaled and their resources utilized efficiently.

FIG. 5 shows an example computer architecture for a computing device 500 capable of executing program components for implementing the functionality described above. In configurations, one or more of the computing devices 500 may be used to implement one or more of the components of FIGS. 1-4. The computer architecture shown in FIG. 5 illustrates a conventional server computer, router, switch, workstation, desktop computer, laptop, tablet, network appliance, e-reader, smartphone, or other computing device, and can be utilized to execute any of the software components presented herein. The computing device 500 may, in some examples, correspond to a physical device or resources described herein.

The computing device 500 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computing device 500.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the computing device 500. The chipset 506 can further provide an interface to a computer-readable storage medium such as a read-only memory ("ROM") 510 or non-volatile RAM ("NVRAM") for storing basic routines that help to startup the computing device 500 and to transfer information between the various components and devices. The ROM 510 or NVRAM can also store other software components necessary for the operation of the computing device 500 in accordance with the configurations described herein.

The computing device 500 can operate in a networked environment using logical connections to remote computing devices and computer systems through a network, such as the network 100. The chipset 506 can include functionality for providing network connectivity through a NIC 512, such as a gigabit Ethernet adapter. In configurations, the NIC 512 can be a smart NIC (based on data processing units (DPUs)) that can be plugged into data center servers to provide networking capability. The NIC 512 is capable of connecting the computing device 500 to other computing devices over networks. It should be appreciated that multiple NICs 512 can be present in the computing device 500, connecting the computer to other types of networks and remote computer systems.

The computing device 500 can include a storage device 518 that provides non-volatile storage for the computer. The storage device 518 can store an operating system 520, programs 522, and data, which have been described in greater detail herein. The storage device 518 can be connected to the computing device 500 through a storage controller 514 connected to the chipset 506. The storage device 518 can consist of one or more physical storage units. The storage controller 514 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 500 can store data on the storage device 518 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 518 is characterized as primary or secondary storage, and the like.

For example, the computing device 500 can store information to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 500 can further read information from the storage device 518 by detecting the physical states or characteristics of one or more particular locations within the physical storage units.

In addition to the mass storage device 518 described above, the computing device 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 500. In some examples, the operations performed by the cloud network, and or any components included therein, may be supported by one or more devices similar to computing device 500. Stated otherwise, some or all of the operations described herein may be performed by one or more computing devices 500 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 518 can store an operating system 520 utilized to control the operation of the computing device 500. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 518 can store other system or application programs and data utilized by the computing device 500.

In one embodiment, the storage device 518 or other computer-readable storage media is encoded with computer-executable instructions which, when loaded into the computing device 500, transform the computer from a general-purpose computing system into a special-purpose computer capable of implementing the embodiments described herein. These computer-executable instructions transform the computing device 500 by specifying how the CPUs 504 transition between states, as described above. According to one embodiment, the computing device 500 has access to computer-readable storage media storing computer-executable instructions which, when executed by the computing device 500, perform the various processes described above with regard to FIGS. 1-4. The computing device 500 can also include computer-readable storage media having instructions stored thereupon for performing any of the other computer-implemented operations described herein.

The computing device 500 can also include one or more input/output controllers 516 for receiving and processing input from a number of input devices, such as a keyboard, a mouse, a touchpad, a touch screen, an electronic stylus, or other type of input device. Similarly, an input/output controller 516 can provide output to a display, such as a computer monitor, a flat-panel display, a digital projector, a printer, or other type of output device. It will be appreciated that the computing device 500 might not include all of the components shown in FIG. 5, can include other components that are not explicitly shown in FIG. 5, or might utilize an architecture completely different than that shown in FIG. 5.

The computing device 500 may support a virtualization layer, such as one or more virtual resources executing on the computing device 500. In some examples, the virtualization layer may be supported by a hypervisor that provides one or more virtual machines running on the computing device 500 to perform functions described herein. The virtualization layer may generally support a virtual resource that performs at least portions of the techniques described herein.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
receiving, by a network controller from a first user, a first network policy intent configuration for a network device;
sending, by the network controller to the network device, a first notification message, wherein the first notification message comprises a first transaction identification (ID);
based at least in part on the first transaction ID, obtaining, by the network device at the network controller, a first configuration file;
receiving, by the network controller from the network device, a first status message indicating a status of application, by the network device, of the first configuration file to the network device, wherein the first status message comprises the first transaction ID;
receiving, by the network controller from a second user, a second network policy intent configuration for the network device;
sending, by the network controller to the network device, a second notification message, wherein the second notification message comprises a second transaction ID;
based at least in part on the second transaction ID, obtaining, by the network device at the network controller, a second configuration file; and
receiving, by the network controller from the network device, a second status message indicating a status of application, by the network device, of the second configuration file to the network device, wherein the second status message comprises the second transaction ID.

2. The method of claim 1, wherein:
obtaining the first configuration file comprises using a first exposed representational state transfer (REST) application programming interface (API) at the network controller; and
receiving the first status message indicating the status of application of the first configuration file to the network device comprises using a second exposed REST API at the network controller.

3. The method of claim 1, further comprising:
maintaining, by the network controller, an inactivity timer;
based at least in part on receiving the first status message, resetting, by the network controller, the inactivity timer; and
based at least in part on expiration of the inactivity timer, sending, by the network controller to the user, a message indicating failure of application of the first configuration file to the network device.

4. The method of claim 1, further comprising:
based at least in part on the first status message, sending, by the network controller to the user, a third status message indicating the status of application of the first configuration file to the network device.

5. The method of claim 1, wherein:
obtaining the second configuration file comprises using a first exposed representational state transfer (REST) application programming interface (API) at the network controller; and receiving the second status message indicating the status of application of the second configuration file comprises using a second exposed REST API at the network controller.

6. The method of claim 1, further comprising:

maintaining, by the network controller, an inactivity timer;

based at least in part on receiving the second status message, resetting, by the network controller, the inactivity timer; and based at least in part on expiration of the inactivity timer, sending, by the network controller to the user, a message indicating failure of application of the second configuration file to the network device.

7. The method of claim 1, further comprising:

based at least in part on the second status message, sending, by the network controller to the user, a fourth status message indicating the status of the network device with respect to application, by the network device, of the second configuration file to the network device.

8. A system comprising:

one or more processors; and one or more non-transitory computer-readable media storing computer-executable instructions that, when executed by the one or more processors, cause the one or more processors to perform actions comprising:

receiving, by a network controller from a first user, a first network policy intent configuration for a network device;

sending, by the network controller to the network device, a first notification message, wherein the first notification message comprises a first transaction identification (ID);

based at least in part on the first transaction ID, obtaining, by the network device at the network controller, a first configuration file; and receiving, by the network controller from the network device, a first status message indicating a status of application, by the network device, of the first configuration file to the network device, wherein the first status message comprises the first transaction ID;

receiving, by the network controller from a second user, a second network policy intent configuration for the network device;

sending, by the network controller to the network device, a second notification message, wherein the second notification message comprises a second transaction ID;

based at least in part on the second transaction ID, obtaining, by the network device at the network controller, a second configuration file; and receiving, by the network controller from the network device, a second status message indicating a status of application, by the network device, of the second configuration file to the network device, wherein the second status message comprises the second transaction ID.

9. The system of claim 8, wherein:

obtaining the first configuration file comprises using a first exposed representational state transfer (REST) application programming interface (API) at the network controller; and receiving the first status message indicating the status of application of the first configuration file to the network device comprises using a second exposed REST API at the network controller.

10. The system of claim 8, wherein the actions further comprise:

maintaining, by the network controller, an inactivity timer;

based at least in part on receiving the first status message, resetting, by the network controller, the inactivity timer; and based at least in part on expiration of the inactivity timer, sending, by the network controller to the user, a message indicating failure of application of the first configuration file to the network device.

11. The system of claim 8, wherein the actions further comprise:

based at least in part on the first status message, sending, by the network controller to the user, a third status message indicating the status of application of the first configuration file to the network device.

12. The system of claim 8, wherein:

obtaining the second configuration file comprises using a first exposed representational state transfer (REST) application programming interface (API) at the network controller; and receiving the second status message indicating the status of application of the second configuration file comprises using a second exposed REST API at the network controller.

13. The system of claim 8, wherein the actions further comprise:

maintaining, by the network controller, an inactivity timer;

based at least in part on receiving the second status message, resetting, by the network controller, the inactivity timer; and based at least in part on expiration of the inactivity timer, sending, by the network controller to the user, a message indicating failure of application of the second configuration file to the network device.

14. The system of claim 8, wherein the actions further comprise:

based at least in part on the second status message, sending, by the network controller to the user, a fourth status message indicating the status of the network device with respect to application, by the network device, of the second configuration file to the network device.

15. One or more non-transitory computer-readable media storing computer-executable instructions that, when executed by one or more processors, cause the one or more processors to perform actions comprising:

receiving, by a network controller from a first user, a first network policy intent configuration for a network device;

sending, by the network controller to the network device, a first notification message, wherein the first notification message comprises a first transaction identification (ID);

based at least in part on the first transaction ID, obtaining, by the network device at the network controller, a first configuration file; and receiving, by the network controller from the network device, a first status message indicating a status of application, by the network device, of the first configuration file to the network device, wherein the first status message comprises the first transaction ID;

receiving, by the network controller from a second user, a second network policy intent configuration for the network device;

sending, by the network controller to the network device, a second notification message, wherein the second notification message comprises a second transaction ID;

based at least in part on the second transaction ID, obtaining, by the network device at the network controller, a second configuration file; and receiving, by the network controller from the network device, a second status message indicating a status of application, by the network device, of the second configuration file to the network device, wherein the second status message comprises the second transaction ID.

16. The one or more non-transitory computer-readable media of claim 15, wherein:

obtaining the second configuration file comprises using a first exposed representational state transfer (REST) application programming interface (API) at the network controller; and receiving the second status message indicating the status of application of the second configuration file comprises using a second exposed REST API at the network controller.

17. The one or more non-transitory computer-readable media of claim 15, wherein the actions further comprise:

maintaining, by the network controller, an inactivity timer;

based at least in part on receiving the second status message, resetting, by the network controller, the inactivity timer; and based at least in part on expiration of the inactivity timer, sending, by the network controller to the user, a message indicating failure of application of the second configuration file to the network device.

18. The one or more non-transitory computer-readable media of claim 15, wherein the actions further comprise:

based at least in part on the second status message, sending, by the network controller to the user, a fourth status message indicating the status of the network device with respect to application, by the network device, of the second configuration file to the network device.

* * * * *